March 16, 1926.

L. C. PHARO

SCREEN CLEANER

Filed Sept. 19, 1925

1,576,616

INVENTOR
LEE COLLIN PHARO
BY ATTORNEY

Patented Mar. 16, 1926.

1,576,616

UNITED STATES PATENT OFFICE.

LEE COLLIN PHARO, OF THETFORD MINES, QUEBEC, CANADA, ASSIGNOR TO ASBESTOS CORPORATION OF CANADA, LIMITED, OF MONTREAL, CANADA, A CORPORATION.

SCREEN CLEANER.

Application filed September 19, 1925. Serial No. 57,379.

*To all whom it may concern:*

Be it known that I, LEE COLLIN PHARO, a subject of the King of Great Britain, and resident of Thetford Mines, Province of Quebec, Canada, have invented certain new and useful Improvements in Screen Cleaners, and do hereby declare that the following is a full, clear, and exact description of the same.

This invention relates to screening devices employing an oscillatory screen and appertains particularly to an attachment for such screen whereby the latter is exposed to vibratory impulses distinct from its oscillatory screening movement for the purpose of dislodging accumulations in the meshes of the screen and preventing clogging or blinding thereof.

Heretofore it has been found that in screening a commodity of a fibrous nature such as asbestos, the screen is particularly subject to clogging or blinding notwithstanding the agitation the screen receives as it is shaken during the screening operation, this agitation being an oscillatory movement in the plane of the screen surface. The object of this invention is to avoid this clogging of the screen by exposing the latter to vibratory impulses directed perpendicularly to the plane of the screen whereby particles tending to accumulate in the meshes are dislodged and the openings cleared for the free passage of the screenings.

Another object is the provision of an attachment for the screen which will be automatically actuated by the screening movements to impart the supplementary mesh clearing vibrations so that the clearing action will be continuous throughout the screening action.

Another object is the provision of the particular combination and arrangement of parts producing the supplemental vibration perpendicularly to the plane of the screen.

The above with further objects and advantages will be hereinafter more fully described in the following specification and particularly pointed out in the accompanying claims.

For full comprehension, however, of my invention reference should be had to the accompanying drawings forming a part of this specification, in which the same reference characters indicate the same parts and wherein.

Figure 1:
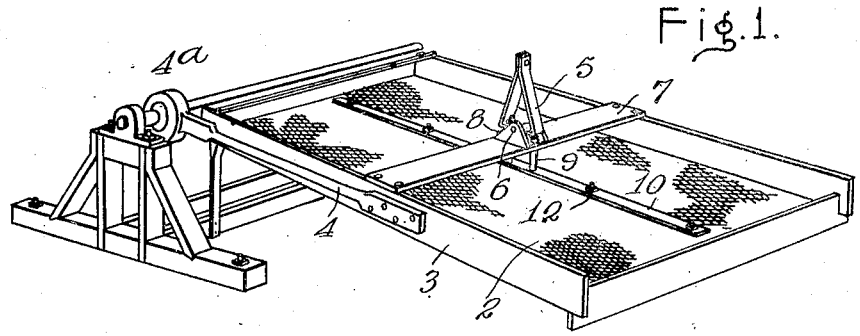
Fig. 1 is a perspective view of a screen with the screen clearing vibratory attachment applied.
Figure 2:
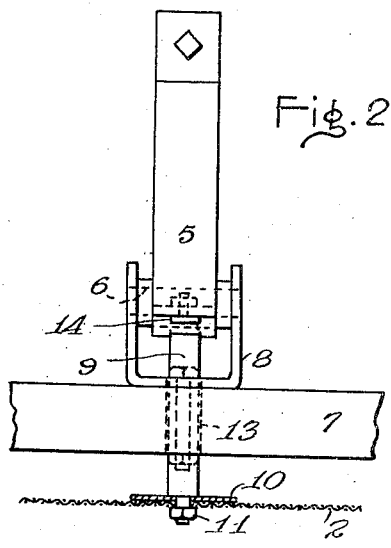
Fig. 2 is an end view of the clearing attachment illustrating its operative connection with the screen.
Figure 3:
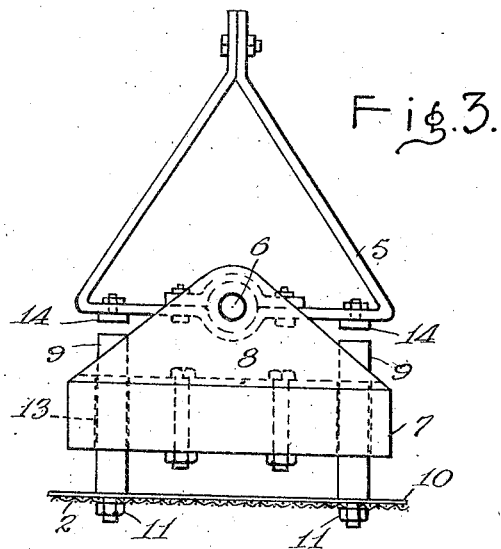
Fig. 3 is a side view thereof.

This invention has been developed especially in connection with the asbestos industry and in the drawings a shaking screen is shown, 2 indicating the wire cloth and 3 the sides and it will be apparent to those with a knowledge of the art, that the connecting rod 4 leads to an eccentric drive 4ª whereby the screen is oscillated to and fro in the plane of the screen surface to shake the asbestos and screen it.

This normal oscillation or shaking of the screen has proven inadequate to prevent clogging of the wire and in order to prevent this clogging I have devised an attachment which will impart vibrations to the cloth perpendicularly thereto and dislodge accumulations tending to clog the mesh, this attachment being actuated by the normal shaking of the screen and functioning continuously during the shaking operation.

The attachment consists of a striker associated with the screen in such manner as to partake of movement independently of the screen and by means of such independent movement impart vibrations to the screen in a plane perpendicular to the screen surface and its oscillatory or shaking movements.

In the preferred embodiment of the invention illustrated the striker consists of a member 5 pivoted between its ends adjacent the screen 2 upon a pivot 6 substantially parallel to the screen and permitting free oscillation or rocking of the member in a path perpendicular to the screen whereby at the end of each oscillation a vibrating stroke is imparted by the striker to the screen perpendicularly thereto.

In detail a cross-piece 7 extends transversely across the screen 2 being fastened at its ends to the sides 3. About midway of this cross-piece an upwardly facing channel bracket 8 is bolted thereto, the sides of the bracket serving as bearings for the pivot pin 6 upon which the rocking striker 5 is mounted. The striker is shown in the form of a metallic triangular frame pivoted midway of its base upon pin 6, this pin extending transversely of the screen and the striker being thus in longitudinal line with the screen, it will oscillate freely under the action of the shaking screen as it is moved longitudinally backwards and forwards by the eccentrically driven connecting rod.

Each end of the striker 5 overhangs a bumper pin 9 fastened at the bottom to the screen and extending upwardly to within a short distance of the striker in position to be struck thereby at the end of an oscillation of the striker, the impulse being communicated to the screen in the form of a perpendicular vibration.

In order to secure the maximum effectiveness of the striker vibrations a metallic strip 10 is clamped upon the screen 2 by passing the bumper pins therethrough and through the screen and fastening the pins by the nuts 11 the strip extending throughout the length of the screen and conveying the vibrations along the length thereof. Clamps 12 in addition to the pins 9, intimately associate the strip 10 and the screen at points remote from said pins 9.

In the preferred construction the bumper pins extend loosely up through openings 13 in the cross-piece and the ends of the striker 5 are provided with striker heads or bosses 14 for contact with the upper ends of the bumper pins.

During the backward and forward oscillation of the screen the freely pivoted striker 5 automatically oscillates perpendicularly through its momentum at the end of each backward and forward movement of the screen and at the end of each oscillation strikes one of the bumper pins and vibrates the screen perpendicularly thus supplementing the agitation of the asbestos being screened as the asbestos is exposed to two perpendicularly related impulses and is therefore more thoroughly shaken up than heretofore in addition to being relieved of the impairment due to the screen clogging, the perpendicular vibrations knocking the accumulations from the wire mesh.

What I claim is as follows:

1. The combination with an oscillatory screen having means for oscillating same in a longitudinal direction, of a cross-piece carried by the screen frame transversely thereof and spaced from the upper surface of the screen-cloth, said cross-piece having vertical guiding apertures therethrough and carrying a bracket-piece apertured in line with the apertures in the cross-piece and acting as a support for a rocking striker; a steel strip extending longitudinally of and secured to the upper surface of the screen-cloth; a pair of bumper pins secured at their lower ends to said steel strip and projecting upwardly through the guiding apertures in the cross-piece and bracket piece; a rocking striker formed of a flat metal strip bent into triangular form and pivoted centrally of its base to said bracket-piece and in such relation to the bumper pins that upon oscillation of the screen the striker will be rocked and each pin alternately struck thereby.

2. The combination with an oscillatory screen having means for oscillating same in a longitudinal direction, of a cross-piece carried by the screen frame transversely thereof and spaced from the upper surface of the screen-cloth, said cross-piece having vertical guiding apertures therethrough and carrying a bracket-piece apertured in line with the apertures in the cross-piece and acting as a support for a rocking striker; a steel strip extending longitudinally of and secured to the upper surface of the screen-cloth; a pair of bumper pins secured at their lower ends to said steel strip and projecting upwardly through the guiding apertures in the cross-piece and bracket-piece; a rocking striker formed of a flat metal strip bent into triangular form, having striker heads projecting from the underside of the base of same, and pivoted centrally of such base to said bracket-piece and in such relation to the bumper pins that upon oscillation of the screen the striker will be rocked and each pin alternately struck by the striker heads.

In testimony whereof, I have signed my name to this specification.

LEE COLLIN PHARO.